United States Patent [19]
Terry

[11] Patent Number: 6,085,642
[45] Date of Patent: Jul. 11, 2000

[54] GUARD DOG COOKING UTENSIL

[76] Inventor: Chase Neveon Terry, P.O. Box 631, Evadale, Tex. 77615

[21] Appl. No.: 09/119,313

[22] Filed: Jul. 20, 1998

[51] Int. Cl.[7] .................................................. A47J 37/04
[52] U.S. Cl. ........................... 99/421 A; 99/394; 99/419
[58] Field of Search ............................ 99/339, 340, 394, 99/419–421 V, 426, 449, 441, 440, 442, 450; 7/118; 16/114 R, 116 R; 30/321–323, 123, 129, 137; 248/124.2; 294/33, 100, 99.1, 50, 61, 49; D7/686, 357, 328, 683

[56] References Cited

U.S. PATENT DOCUMENTS

| | | | |
|---|---|---|---|
| 489,056 | 1/1893 | Westheimer | 99/394 |
| 2,041,369 | 5/1936 | Pickett | 99/421 A |
| 2,317,388 | 4/1943 | Lako, Jr. | 99/419 |
| 2,479,324 | 8/1949 | Dawson | 99/419 |
| 2,479,533 | 8/1949 | Woodbury | 99/419 |
| 2,594,500 | 4/1952 | Runnoe | 99/394 |
| 2,706,446 | 4/1955 | Lockey | 99/419 |
| 3,433,151 | 3/1969 | Farran et al. | 99/394 X |
| 3,745,910 | 7/1973 | Delamater | 99/419 |
| 4,569,278 | 2/1986 | Reynolds | 99/394 |
| 5,355,778 | 10/1994 | Mayfield et al. | 99/441 |
| 5,628,244 | 5/1997 | Holliday | 99/441 X |
| 5,775,207 | 7/1998 | Warren | D7/686 X |

*Primary Examiner*—Timothy Simone

[57] ABSTRACT

A cooking utensil is provided for use over open fires, grates or the like. The utensil has a metallic Rod having an insulating handle end and a pointed skewer end. Near the skewer end a slideable protective cover of an open mesh design is mounted to move up or down the rod under the influence of gravity. The cover may be moved up the rod toward the handle for placing a foodstuff on the utensil and then moved down the rod to protectively cover the foodstuff and protect it as it is cooked over the fire.

4 Claims, 1 Drawing Sheet

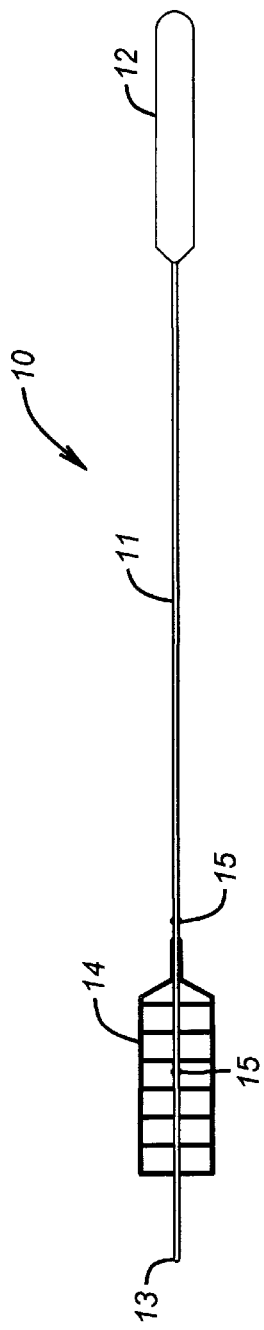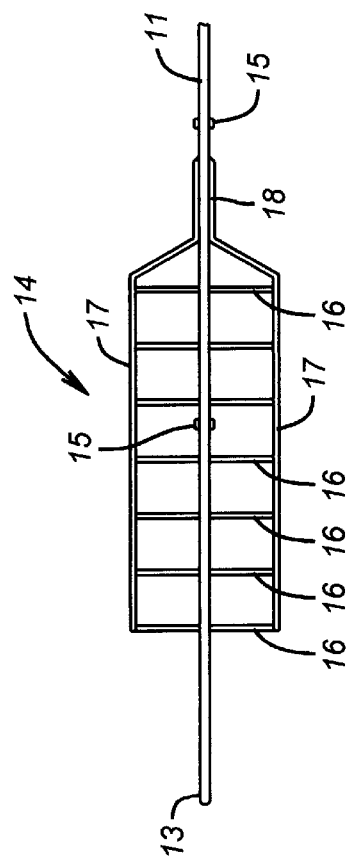

GUARD DOG COOKING UTENSIL

BACKGROUND OF THE INVENTION

1. Field of the Invention

This invention pertains to cooking utensils, and more particularly, to hand held cooking utensils for use in cooking food stuffs over open fires.

A popular picnic pastime is the cooking or grilling of food stuffs such as sausages, marshmallows, or frankfurters over an open fire. In cooking such foods over an open fire it is desirable to have cooking utensils with handles long enough to prevent the scorching or burning of the cook, and yet sturdy enough to support the food without losing control of the utensil. A heat insulative handle is desirable, as placing the food to be cooked on a metal utensil in the vicinity of the fire can lead to the utensil itself becoming very hot to the touch.

It is also desirable to protect the food being cooked, particularly if it tends to soften as it is cooked, and to prevent it from coming off the cooking utensil and falling into the open fire. Similarly, it is desirable to be able to view the food as it is cooking in order to determine its degree of done-ness. It would be desirable to provide an inexpensive, safe, easy to use, cooking utensil which has each of the desirable features enumerated above.

2. Brief Description of the Invention

The present invention is a cooking utensil, hand held, for cooking foodstuff such as frankfurters, marshmallows, or the like over an open fire. A long skewer member made of stainless steel wire, or the like, is provided at one end with a heat insulative handle. Near the opposite end of the skewer a guard cage of an open mesh type is provided, which allows the food to be viewed. The guard cage is slideably mounted on the skewer in such a manner that it is axially moveable from an open position to a closed or guard position. The construction of the utensil is very economic and it provides heretofore not attained protection of the food while it is being cooked over an open fire.

The invention is best understood by reference to the following detailed description thereof, when taken in conjunction with the accompanying drawings.

BRIEF DESCRIPTION OF THE DRAWINGS

FIG. 1 is an overall side view of the cooking utensil of the invention.

FIG. 2 is a side view enlargement of a portion of FIG. 1 showing the guard cage in more detail

DETAILED DESCRIPTION OF THE INVENTION

Referring initially to FIG. 1, a side view of the invention is given. A skewer member (shown generally at 10) having a handle portion 12 at one end and conjoined by a rod 11 is provided. The overall length of the cooking skewer 10 can range from about 2 feet to about 3 feet. The rod 11 of which the utensil is formed is preferably stainless steel wire or rod stock about ⅛ inch in diameter. The 2 to 3 foot length to allow food skewered on sharp end 13 to be held in the cook fire without scorching the hand of the cooker on handle 12. The handle 12 is formed of, typically, hardwood dowel stock having a diameter of about 1 inch. The rod stock of about ⅛ inch diameter is sufficiently rigid to support the weight of food being cooked without undue bending.

A metal wire formed, or mesh, cage 14 is slideably attached near the sharpened end 13 of rod 11. As shown in FIG. 2 the cage or guard 14 is formed of a plurality of wire rings 16 of about 1/16 inch diameter stainless steel wire and having a generally circular shape. The circular rings 16 are attached by soldering, brazing or spot welding to at least three longitudinal members 17, equally angularly spaced, and attached about the periphery of rings 16. The longitudinal members are twisted together on the closed end of the cage, as shown, to provide a slideable runner 18 which can move longitudinally along rod member 11.

A pair of stops 15 are spaced apart a convenient distance (about the length of a typical frankfurter or 4 to 5 inches) and are soldered or brazed or spot welded onto rod 11 in such a manner that cage 14 can slide on rod 11 between stops 15 and so that the cage 14 covers or un-covers the sharpened end 13 of the skewer, depending on its position. The fit of runner 18 is such that cage 14 is free to move between stops 15 under the influence of gravity.

In operation a selected foodstuff, such as a frankfurter, is skewered lengthwise on the sharpened end 13 of rod 11 with the handle 12 held to position the guard or cage toward the handle 12 end. When it is desired to place the foodstuff in or near the fire for cooking, the handle 12 is elevated, allowing guard or cage 14 to slide toward the sharpened end 13 of the device. This covers the foodstuff and protects it while it is cooked.

The foregoing descriptions may make alternative arrangements apparent to those of skill in the art. It is the aim of the appended claims to cover all such changes and modifications that fall with the true spirit and scope of the invention.

I claim:

1. An inexpensive cooking utensil for use on open fires for cooking, and protecting while cooking foodstuffs held by the utensil, comprising:

a skewer member having a handle end and a sharpened point end and formed of metal rod of sufficient diameter to support a foodstuff to be cooked without undue flexure of the skewer member, said skewer member having a heat insulating material attached to its handle end to form a handle and having, near its sharpened point end, a moveable guard or cage member, slideably mounted on said rod between an open position and a closed position, said guard or cage member having a generally circular cross section and being formed of wire rings fixedly attached to at least three longitudinal support members, said support members being twisted together to form an annular slide runner sized to allow internal passage of said rod member therethrough, thereby allowing said guard or cage member to slide from an open position nearer said handle end to a closed position nearer said sharpened point end of said rod member.

2. The utensil of claim 1 wherein said rod member and said cage member are stainless steel.

3. The utensil of claim 1 wherein said handle material is wood.

4. The utensil of claim 1 wherein said cage or guard member open and closed positions are spaced apart a distance sufficient to cover and uncover a typical foodstuff being cooked.

\* \* \* \* \*